United States Patent [19]
Hancock

[11] Patent Number: 4,486,368
[45] Date of Patent: Dec. 4, 1984

[54] METHOD OF MAKING A COMPOSITE FOAMED RESIN SKI
[75] Inventor: Kendal Hancock, Wichita Falls, Tex.
[73] Assignee: Texas Recreation Corporation, Wichita Falls, Tex.
[21] Appl. No.: 431,485
[22] Filed: Sep. 30, 1982
[51] Int. Cl.³ ............................................. B29D 27/00
[52] U.S. Cl. ................................... 264/46.7; 264/45.5; 264/101; 264/275; 264/DIG. 83; 425/117; 425/547; 425/817 R
[58] Field of Search ............... 264/46.7, 46.8, 46.4, 264/46.5, 101, 275, 271.1, DIG. 83, 45.5; 425/117, 547, 817 R

[56] References Cited
U.S. PATENT DOCUMENTS

| 2,762,739 | 9/1956 | Weiss | 264/46.7 X |
| 3,090,078 | 5/1963 | Ackles | 264/46.8 X |
| 3,207,822 | 9/1965 | Makowski | 264/275 X |
| 3,247,550 | 4/1966 | Haines, Jr. | 264/275 X |
| 3,738,675 | 6/1973 | Hashimoto | 264/46.7 X |
| 4,046,611 | 9/1977 | Sanson | 264/46.4 X |
| 4,065,539 | 12/1977 | Nadel | 264/275 X |
| 4,250,585 | 2/1981 | Theriault et al. | 264/46.7 X |
| 4,259,274 | 3/1981 | Tiitola | 264/46.5 |
| 4,261,778 | 4/1981 | Albrigtsen et al. | 280/610 X |

FOREIGN PATENT DOCUMENTS

| 2124492 | 11/1972 | Fed. Rep. of Germany | 264/275 |
| 2000717 | 1/1979 | United Kingdom | 264/46.5 |

Primary Examiner—Philip Anderson
Attorney, Agent, or Firm—James C. Wray

[57] ABSTRACT

A pre-shaped aluminum plate is held against the flat end wall of an inverted mold cavity by vacuum pressure communicated through bore holes in the wall leading to a vacuum chamber in the mold body. A high temperature PTFE gasket shaped to match the plate fits in an annular recess in the wall to provide a seal between the wall and plate. Polyurethane foam expands and hardens in the mold cavity to further press the plate against the wall and to form a foamed plastic water ski having a flush aluminum deck. The mold cavity has a curved side wall to produce a ski having a radiused edge about the deck.

35 Claims, 3 Drawing Figures

U.S. Patent  Dec. 4, 1984  4,486,368
FIG. 1
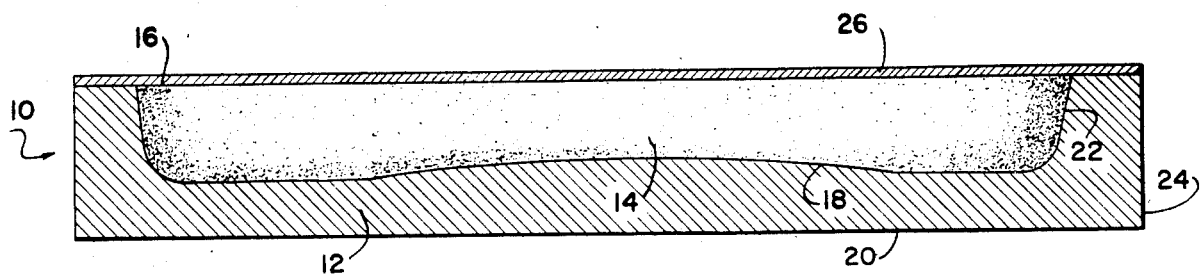
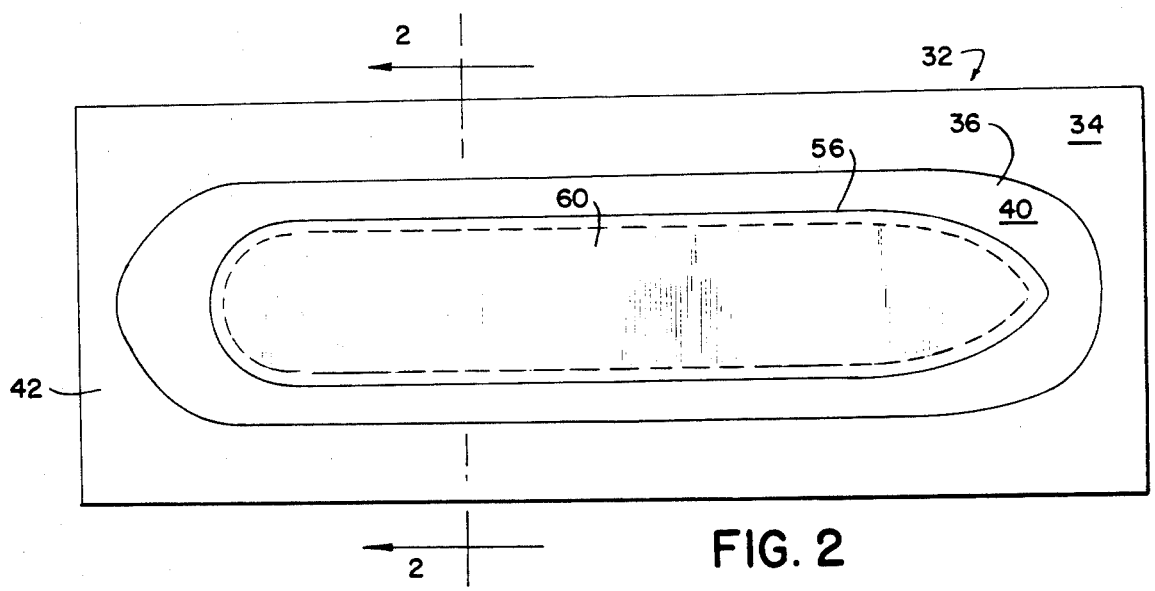
FIG. 2
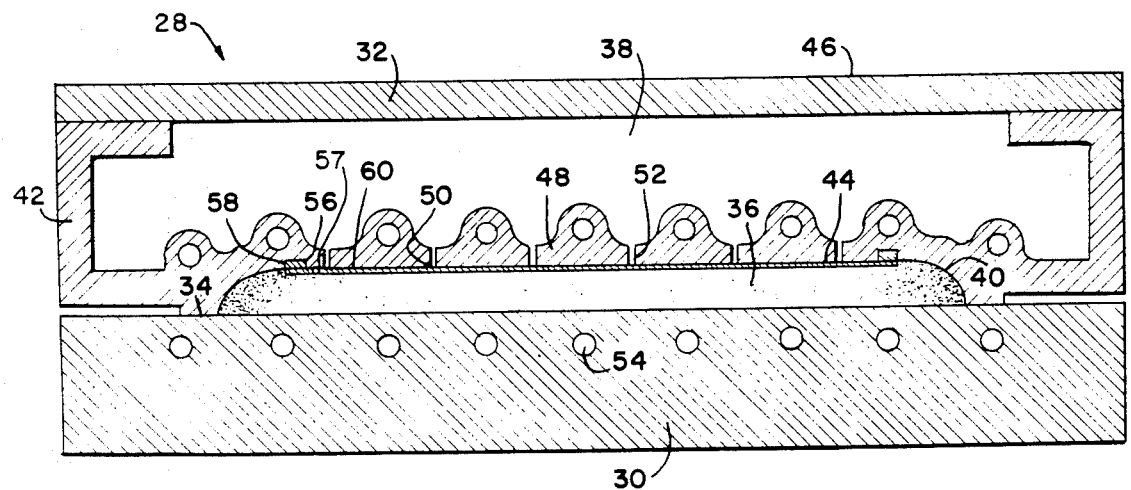
FIG. 3

METHOD OF MAKING A COMPOSITE FOAMED RESIN SKI

BACKGROUND OF THE INVENTION

This invention relates generally to a method for making an article having a foamed plastic body and a surface plate and more particularly has reference to a method for making a polyurethane foam water ski having a flush aluminum deck.

The current method for making foamed plastic water skis having aluminum decks is described in U.S. Pat. No. 4,250,585, the disclosure of which is incorporated herein by reference.

The patent describes a reaction injection molding process. A plurality of rods are positioned in a mold cavity by plastic jigs. An aluminum sheet pre-treated to bond to foamed plastic is placed at the mold parting line to close the mold cavity. Foam is injected into the cavity, where it expands and hardens and bonds to the aluminum sheet. The ski blank is removed from the mold and the aluminum top surface is trimmed to the desired shape.

The known process has a number of disadvantages.

The requirement that the aluminum sheet be placed at the mold parting line limits ski design. The ski will necessarily have a flat top surface and will necessarily have a deck which lies on top of the foamed plastic body. Those features detract from the safety and appearance of the product.

Another disadvantage is that costly and labor intensive production steps are needed to trim the deck after molding. Those steps include bandsaw trimming of the aluminum deck top, routing the remaining edge material, and filing the edge for smoothness. The trimming steps also increase the likelihood of product damage during manufacture.

A need thus exists for a process in which a die cut aluminum ski top can be placed in the mold cavity, thereby eliminating all product design limitations and reducing the labor required to trim the ski top.

One obstacle which has heretofore prevented fulfillment of that need is the extreme mold pressures which develop in reaction injection molding. The foam enters the mold in a liquid state. The foam then expands rapidly to fill the mold cavity and produce a dense structural foam body. When attempting to place a pre-cut aluminum top in a mold cavity, a perfect seal must be maintained or the extreme mold pressures will cause the foam material to leak around and distort the aluminum top.

Pertinent U.S. and foreign patents are found in Class 264, subclasses 46.4, 46.7, 46.8, 45.5 and Digest 83; Class 9, subclasses 310 A, 310 E and 310 R; Class 427, subclass 388.1 and Class 441, subclasses 68, 70 and 74 of the official classifications of patents in the U.S. Patent and Trademark Office.

Examples of pertinent patents are U.S. Pat. Nos. 4,046,611; 4,261,778; 2,920,898; 3,173,161; 3,318,609 and 3,928,106.

U.S. Pat. No. 4,046,611 shows a gasket, vacuum forming and polyurethane foam blow molding. However, the patent does not use a plate and does not use a gasket to prevent migration of the foam around the plate.

U.S. Pat. No. 4,261,778 shows a polyurethane foam ski construction. However, the patent does not show an inverted mold cavity, a gasket, or a vacuum-held plate.

The remaining patents are less pertinent and are cited merely to show the state of the art in ski construction.

None of the patents fulfills the above-cited need for a process in which a die cut aluminum ski top can be placed in the mold cavity.

SUMMARY OF THE INVENTION

The present invention overcomes the problems which exist in the prior art.

The present invention uses a vacuum to hold an aluminum ski top against an upper wall of a mold cavity. Pins align the ski top in the mold. A high temperature PTFE gasket which matches the shape of the precut aluminum ski top fits in a recess in the cavity above the edge of the ski top. The vacuum draws the aluminum top upward, with its upper surface periphery in tight sealing contact with the gasket. The mold is closed and polyurethane foam is flowed into the mold. The material expands into dense foam, forcing the aluminum top even more tightly against the upper wall of the cavity and against the gasket. An improved ski results in which the aluminum top is recessed in the body and the foam tightly surrounds the edge of the top without flowing over peripheral areas of the top.

The present invention has several advantages over the prior art, namely, the elimination of three or four trimming steps in the production process, a reduction in the number of blemishes and seconds in the products produced, and the ability to produce skis having something other than a flat top surface.

Objects of the invention are, therefore, to provide an improved foamed plastic article and, more specifically, to provide an improved foamed plastic water ski having an aluminum top deck.

Another object of the invention is to provide a method for molding skis wherein a pre-cut aluminum sheet is positioned in the mold before molding and forms the top deck of the ski.

Yet another object of the invention is to provide a method for making a ski wherein post-molding trimming steps are eliminated.

A further object of the invention is to provide a method for making a ski having a rounded or radiused top edge.

Still another object of the invention is to provide a foamed plastic ski having a flush aluminum top deck.

Still another object of the invention is to provide a method using a mold for making a foamed plastic ski having a vacuum chamber in communication with openings in a mold cavity wall, whereby an aluminum plate or sheet used to form the top deck of the ski is held against the cavity wall during molding by vacuum pressure.

Yet another object of the invention is to provide a high temperature PTFE gasket shaped to match the plate recessed in the mold cavity wall for providing a seal between the plate and the wall.

Yet another object of the invention is to provide a method using a mold having an inverted mold cavity with a flat end wall and a curved side wall.

Yet another object of the invention is to provide a process for making an article having a foam body and a surface plate comprising the steps of positioning of a plate within a mold cavity, holding the plate against a surface of the mold cavity with vacuum pressure, injecting foam material into the mold cavity, expanding the foam to fill the mold and to bring the foam into contact with the plate, internal pressure generated by said expanding foam further urging the plate against said surface, and hardening the foam to form a foam body having said plate affixed thereto.

Yet another object of the invention is to provide a method using a mold apparatus comprising a mold body provided with an interior mold cavity and a vacuum chamber, said mold cavity having a cavity wall provided with one or more openings, and passageway means extending between the vacuum chamber and the mold cavity for establishing communication between said vacuum chamber and said wall openings.

These and other and further objects and features of the invention are apparent in the disclosure which includes the above and below specification and claims and drawings.

BRIEF DESCRIPTION OF THE DRAWINGS

FIG. 1 is an end view, in section, of a known ski mold, showing the aluminum top positioned at the parting line of the mold.

FIG. 2 is a bottom view of an upper mold body embodying features of the present invention, showing an aluminum ski top positioned within the mold cavity.

FIG. 3 is a sectional view taken along the Line 3—3 shown in FIG. 2.

DETAILED DESCRIPTION OF THE DRAWINGS

Referring to FIG. 1, a known ski mold is indicated generally by the numeral 10. Details of the mold and of the method for using the mold to form a foam plastic water ski having an aluminum top deck are described in the above-cited U.S. Pat. No. 4,250,585.

Briefly, the mold 10 has an elongated rectangular mold body 12 having mold cavity 14 formed therein. The top surface of the mold body 12 forms a mold parting line 16. The cavity 14 extends downward into the body 12 from the parting line 16. The curved base wall 18 of the cavity 14 is spaced from the base 20 of the mold body 12 and the slanted annular side wall of the cavity 14 is spaced inward from the sides 24 of the mold body 12.

An elongated rectangular aluminum sheet 26 is positioned on the parting line 16. The sheet 26 extends to the sides 24 of the mold body 12, thereby completely closing the open top end of the mold cavity 14. The sheet 26 is pretreated to bond to foamed plastic.

Polyurethane foam is injected into the mold cavity 14 while the sheet 26 is restrained. The foam expands to fill the cavity 14 and to come into contact with the bottom surface of the sheet 26. The expanded foam is then hardened into a dense polyurethane body having a cross sectional shape identical to the cross ectional shape of the mold cavity 14. The bottom surface of the aluminum sheet 26 bonds to the top surface of the polyurethane body during the hardening process.

If desired, reinforcing elements can be placed in the cavity 14 prior to injecting foam to produce a reinforced polyurethane body.

After hardening, the polyurethane body and aluminum sheet are removed from the mold body for finishing. It will be appreciated that the aluminum sheet 26 sits atop the polyurethane body and that peripheral portions of the sheet 26 overhang the peripheral edge of the polyurethane body. In finishing, the overhanging portions of the sheet 26 are sawed, routed and filed until the peripheral shape of the sheet 26 is generally identical to the peripheral shape of the polyurethane body.

The finished ski thus has a polyurethane body with slanted sides and a curved bottom and an aluminum deck extending completely across the top surface of the polyurethane body. It will be appreciated that the molding process prevents the deck from being recessed in the polyurethane body and from providing anything other than a flat top surface on the ski.

The present invention provides a method and apparatus for making foamed plastic water skis which overcome the limitations of the prior art. Specifically, the method of the present invention eliminates the post-molding trimming steps needed to form the top deck of the ski and is capable of producing skis having something other than a flat top surface.

The preferred application of the method of the present invention is in making a trick water ski having a radiused top area with an inset aluminum deck. The mold of the present invention described herein is uniquely adapted for practicing the process to make such a ski. It is understood, however, that the process of the instant invention can be used to make many other products, such as slalom skis, combination pairs and knee boards, and that the mold described herein can be readily adapted for use in such processes.

Referring to FIGS. 2 and 3, a mold useful in practicing the process of the present invention is indicated generally by the numeral 28.

The mold 28 has a pair of separable elongated rectangular mold bodies 30 and 32. The bodies 30 and 32 have abutting surfaces which define a parting line 34 of the mold 28.

One of the mold bodies 32 is provided with a mold cavity 36 and a vacuum chamber 38. The mold cavity 36 extends into the mold body 32 from the parting line 34. The curved annular sidewall 40 of the cavity 36 is spaced inward from the sides 42 of the mold body 32 and the flat base wall 44 of the cavity 36 is spaced inward from the base 46 of the mold body 32. The vacuum chamber 38 is formed in the mold body 32 between the mold cavity 36 and the base 46 of the mold body 32. A partition wall 48 formed integrally with the mold body 32 separates the vacuum chamber 38 from the mold cavity 36. The mold cavity 36 and vacuum chamber 38 are longitudinally extended along the mold 32, as shown in FIG. 2.

In the preferred embodiment, the mold body 32 having the mold cavity 36 and the vacuum chamber 38 forms the top of the mold 28 and the other mold body 30 forms the bottom of the mold 28. This provides an inverted mold cavity, i.e., a mold cavity which extends upwardly into the top part of the mold and faces downwardly towards the bottom part of the mold. It will be appreciated, however, that the bodies 30 and 32 can be reversed so that the mold body 32 having the mold cavity 36 and the vacuum chamber 38 would form the bottom part of the mold 28 and provide a non-inverted mold cavity. The reasons for the preferred arrangement will be discussed later.

The base wall 44 of the mold cavity 36 is provided with a plurality of openings 50. Bores 52 extending through the partition wall 48 provide communication between the vacuum chamber 38 and the openings 50. In the preferred embodiment, several dozen bores 52 of about 0.0625" diameter are provided. It is understood, however, that the number and size of the bores 52 can be varied without departing from the present invention.

A plurality of temperature control lines 54 extend longitudinally through the partition wall 48 and through aligned portions of the lower mold body 30 adjacent the parting line 34.

A gasket 56, preferably formed of high temperature PTFE material, is positioned in an annular recess 58 which extends along the periphery of the base wall 44 at the junction of the base wall 44 and side wall 40 of the mold cavity 36. The gasket 56 surrounds the openings 50 in the base wall 44 and the bores 52 and the partition wall 48.

To initiate the production, a sheet 60 of semirigid material, preferably aluminum, is die cut to an elongated, generally rectangular shape. The shape of the cut sheet 60 is identical to the desired shape of the top deck of the completed ski. As shown in FIG. 2, the peripheral shape of the cut sheet 60 is substantially identical to the peripheral shape of the gasket 56.

The cut sheet 60 is placed in the mold cavity 36 and pressed firmly into abutment with the base wall 44. The peripheral edge of the sheet 60 is aligned with the peripheral edge of the gasket 56 so that the sheet 60 seats on the gasket 56. A vacuum source (not shown) in communication with the vacuum chamber 38 is activated, preferably by a foot switch (not shown), to draw a vacuum in the vacuum chamber 38. Preferably, about 25 inches of vacuum are drawn. Vacuum pressure acts through the bores 52 and base wall openings 50 to pull the sheet 60 against the base wall 44, thereby creating a tight seal between the sheet 60 and gasket 56. The recess 58 in the partition wall 48 is sufficiently deep so that the top surface of the sheet 60 abuts flatly against the cavity base wall 44.

It is appreciated that the vacuum pressure sealing the sheet 60 against the gasket 56 could be provided in alternative ways. For example, the vacuum chamber 38 could be located remote from the mold body 32 so long as means were provided for placing the vacuum chamber in communication with the base wall openings 50. The means for communication need not be bores extending through the partition wall. An alternative communication means would be pipes or conduits extending outside the mold body 32.

Alignment of the sheet 60 with the gasket 56 can be facilitated by providing one or more alignment pins 57 on the mold body 32. It is understood, however, that the pins are not essential and that alignment can be obtained by trial-and-error manipulation of the sheet 60 within the mold cavity 36.

The sheet 60 is preferably treated so as to enable foamed plastic to be bonded to the sheet 60 as the plastic is foamed and hardened. Methods for pretreating aluminum are described in detail in the above-cited U.S. Pat. No. 4,250,585.

After the sheet 60 is treated, positioned and sealed against the gasket 56, the mold 28 is closed by bringing adjacent surfaces of the mold bodies 30 and 32 into abutment with each other along the mold parting line 34. The molding process is now ready to commence.

The molding process of the present invention is basically a reaction injection molding process. Any of the well known plastic foam-producing materials are injected into the mold cavity 36 through one or more inlets in the mold (not shown) and trapped air is allowed to escape through a suitable vent (not shown). Suitable foam materials and auxiliary agents are discussed in the above-cited U.S. Pat. No. 4,250,585. Poylurethane foam is the preferred material for use in the present invention.

The plastic enters the mold cavity 36 in a liquid state. Hence, it initially rests upon the upper surface of the lower mold body 30 and does not come into contact with the sheet 60. However, the ingredients quickly react to produce a rapidly expanding foam which fills the mold cavity 36. The blowing action of the foam generates internal pressure within the cavity 36 which further urges the aluminum sheet 60 against the cavity base wall 44 to create an even tighter seal between the sheet 60 and the gasket 56.

The expanding foam comes into contact with the bottom surface of the sheet 60 and migrates up along the peripheral edge of the sheet 60. The seal between the sheet 60 and the gasket 56 prevents the foam from migrating onto the top side surface of the sheet 60. The foam is then hardened to produce a dense foam body having a tough skin or crust and having the sheet 60 bonded thereto. Selection of suitable molding conditions of time, temperature and pressure are within the skill of the art.

If desired, the foamed plastic body can be reinforced with internal structural parts such as steel rods and plastic clips. A method and apparatus for forming such a reinforced body is described in the above-cited U.S. Pat. No. 4,250,585, and it is recognized that such method and apparatus can be used in the present invention.

The reason for preferring use of the inverted mold cavity shown in FIG. 3 can now be readily understood.

A tight seal must be established between the sheet 60 and the gasket 56 before the foam material comes into contact with the sheet 60 or else the extreme mold pressures will cause the foam material to leak around and distort the sheet 60. If the sheet were positioned at the bottom of a non-inverted cavity, the injected liquid material would flow to the bottom of the cavity and come into contact with the sheet before the onset of foaming. Hence, the vacuum force acting on the sheet would have to be alone sufficient to seal the sheet against the gasket and prevent the liquid from flowing between the sheet and the gasket. By positioning the sheet 60 at the top of an inverted mold cavity 36, as is done in the present invention, the injected material does not come into contact with the sheet 60 until it becomes well foamed. At that point, the sheet 60 is urged into sealing contact with the gasket 56 by a combination of the vacuum force and the internal pressure generated by the foaming process. Hence, a tight seal between the sheet 60 and gasket 56 is more readily assured at the critical time.

When the molding process is complete, the mold bodies 30 and 32 are separated from each other along the parting line 34 and the molded product is removed from the mold cavity 36. The product is a completed water ski having a foamed plastic body and an aluminum top deck.

The water ski produced by the present invention has a number of features which are not possible in water skis produced by prior art methods.

In the present invention, the deck sheet 60 is narrower than the mold cavity 36 and is positioned along the flat base wall 44 of the mold cavity 36. The side wall 40 of the cavity 36 curves outwardly beyond the peripheral edges of the sheet 60. As a result, the ski has a radiused top edge of foamed plastic around the deck sheet 60, as shown in FIG. 3.

In contrast, the prior art process uses a deck sheet which is wider than the mold cavity and which is positioned at the mold parting line during the molding process. The junction between the sheet and the side wall of the mold cavity is a sharp corner. As a result, a ski produced by the prior art process will necessarily have a flat top and a deck extending completely across the top.

Another unique feature in skis produced by the present invention is that the top deck 60 is recessed in the foamed body. Referring to FIG. 3, it can be seen that the top surface of the sheet 60 abuts flatly against the cavity base wall 44 and is substantially coextensive with the cavity side wall 40. The foam expands along the side wall 40 until it comes into contact with the peripheral edge of the sheet 60. Hence, the deck sheet 60 is recessed in the foam body and the top surface of the deck sheet 60 is flush with the surrounding portions of the foamed body.

In contrast, the prior art process positions the deck sheet outside of the mold cavity during the molding process. The expanding foam in the mold cavity contacts only the bottom surface of the deck sheet. Hence, the ski has a deck which sits atop the foam ski body.

While the invention has been described with reference to specific embodiments, the exact nature and scope of the invention is defined in the following claims.

I claim:

1. A process for making an article having a foam body and a surface plate comprising steps of positioning a plate within a mold cavity, holding the plate against a surface of the mold cavity with vacuum pressure, injecting foam material into the mold cavity without initially contacting the surface plate, expanding the foam to fill the mold cavity and to bring the foam into contact with the plate, extreme internal pressure generated by said expanding foam further urging the plate against said surface to prevent leakage of foam material to an upper surface of the surface plate, and hardening the foam to form a foam body having said plate affixed thereto.

2. The process of claim 1 wherein seal means is positioned between said plate and said surface, said vacuum pressure and said extreme internal pressure holding the plate in sealing contact with the seal means.

3. The process of claim 2 wherein the seal means comprises a gasket.

4. The process of claim 3 wherein the gasket is formed of high temperature PTFE material.

5. The process of claim 2 wherein the seal means is positioned in a recess in said surface.

6. The process of claim 2 wherein the peripheral shape of the seal means is substantially identical to the peripheral shape of the plate and is aligned therewith.

7. The process of claim 1 wherein the foam is expanded to surround peripheral edges of the plate, thereby recessing the plate in the foam body.

8. The process of claim 1 wherein the foam is expanded to surround peripheral edges of the plate without migrating onto side surfaces thereof, whereby the plate is flush with a surface of the foam body.

9. The process of claims 7 or 8 wherein the plate has smaller dimensions than the surface to allow the expanding foam to surround said peripheral edges.

10. The process of claim 1 wherein the step of positioning the plate comprises aligning the plate with alignment pins.

11. The process of claim 1 wherein the plate is pre-cut to the desired shape of the surface plate prior to said injecting of the foam.

12. The process of claim 1 wherein the mold cavity is inverted.

13. The process of claim 1 wherein said surface comprises a molding cavity wall.

14. The process of claim 1 wherein said surface comprises an upper surface of the mold cavity.

15. The process of claim 1 wherein said surface is provided with an opening to a vacuum source, said vacuum source producing a vacuum which acts through the opening to pull the plate against the surface.

16. The process of claim 11 wherein portions of said surface extending beyond the periphery of said plate are curved, whereby the foam body has a radiused edge about said plate.

17. The process of claim 1 wherein the plate is formed of semi-rigid material.

18. The process of claim 1 wherein the plate is formed of aluminum.

19. The process of claim 1 wherein the foam comprises polyurethane foam.

20. The process of claim 1 wherein the foam body having said plate affixed thereto comprises a water ski, said plate forming a top deck thereof.

21. A process for molding an article using a mold apparatus having a mold body provided with an internal mold cavity and a vacuum chamber, the mold cavity having a cavity wall provided with one or more openings and passageway means extending between the vacuum chamber and the mold cavity for establishing communication between the vacuum chamber and the wall opening, and the mold body comprising a first bottom portion having a flat surface defining a mold-parting line and a second top portion having a surface which abuts the flat surface and having the mold cavity formed therein, the vacuum chamber being formed in the second top portion at a location spaced from the mold cavity, the process comprising the steps of pretreating a die-cut sheet with an adhesive substance, placing the die-cut sheet in the mold cavity of the first top portion prior to joining the first top portion to the second bottom portion, pressing the die-cut sheet firmly into abutment with a base wall of the first top portion and aligning a peripheral edge of the die-cut sheet with a peripheral edge of a gasket recessed in the base wall of the first top portion so that the die-cut sheet seats on the gasket, drawing a vacuum in the vacuum chamber to create a vacuum pressure which acts through bores provided in the base wall to pull the sheet against the base wall creating a tight seal between the die-cut sheet and the base wall, the gasket being interposed therebetween, closing the mold by bringing together adjacent surfaces of the first top portion and the second bottom portion along the mold-parting line, injecting foam-producing material into the mold cavity in a liquid state, the material initially resting on an upper surface of the second bottom portion without contacting the die-cut sheet, the material quickly reacting thereafter to produce a rapidly expanding foam which creates internal pressure within the mold cavity to further strengthen the seal between the die-cut sheet and the base wall, the seal preventing foam from migrating to an upper surface of the die-cut sheet, and hardening the foam-producing material to create a dense foam body having the die-cut sheet bonded thereto.

22. A method of making a ski comprising placing a plate against a top of a mold cavity, aligning the plate with a peripheral gasket in a recess in the top of the mold cavity, holding the plate upward against the top of the mold cavity by reducing pressure on an upper surface of the plate, and sealing the reduced pressure on the upper surface of the plate with the peripheral gasket, closing an open lower end of the mold cavity and injecting reaction material in the mold cavity.

23. The method of claim 22 further comprising forcing the plate upward against the peripheral gasket by the injection of the reaction materials in the mold cavity.

24. The method of claim 22 further comprising forcing the plate upward against the peripheral gasket by increasing pressure in the mold cavity upon reaction of the injected materials in the mold cavity.

25. The method of claim 22 wherein the aligning the plate with the peripheral gasket comprises aligning peripheral edges of the plates with outer edges of the gasket.

26. The method of claim 25 further comprising preventing of material flow beyond edges of the plate by the peripheral gasket.

27. The method of claim 22 further comprising holding the plate against the top of the mold cavity by reducing pressure in pores extending through the top of the mold cavity.

28. The method of claim 22 further comprising the initial step of placing a peripheral gasket in a recess in the top of the mold cavity.

29. The method of claim 22 further comprising tightly sealing the mold cavity with a lower surface of the peripheral gasket and an upper peripheral surface area of the plate lying against the lower surface of the peripheral gasket.

30. The method of claim 22 wherein the reducing pressure comprises reducing pressure in a vacuum chamber within a mold body above the mold cavity.

31. The method of claim 22 further comprising sealing a bottom of the mold cavity with a lower mold body.

32. The method of claim 22 wherein the sealing of the mold cavity comprises sealing the mold cavity with a flat upper surface of the lower mold body.

33. The method of claim 22 further comprising expanding the injected materials upward along inwardly curved surfaces and inward toward peripheral edges of the plate.

34. The method of claim 22 wherein the placing the plate comprises placing an aluminum plate against the upper surface of the mold cavity.

35. The method of claim 34 wherein the holding the plate against a peripheral gasket comprises holding the plate against a high-temperature PTFE gasket.

* * * * *